United States Patent
Aloni et al.

(10) Patent No.: US 10,904,602 B2
(45) Date of Patent: Jan. 26, 2021

(54) EDGE OPTIMIZED TRANSRATING SYSTEM

(71) Applicant: ORCKIT IP, LLC., Newton, MA (US)

(72) Inventors: Eliezer Aloni, Kohav Yair (IL); Gal Mor, Herziliya (IL); Noam Brousard, Tel Aviv (IL)

(73) Assignee: ORCKIT IP, LLC, Dover, DE (US)

( * ) Notice: Subject to any disclaimer, the term of this patent is extended or adjusted under 35 U.S.C. 154(b) by 0 days.

(21) Appl. No.: 16/511,001

(22) Filed: Jul. 15, 2019

(65) Prior Publication Data

US 2019/0342596 A1 Nov. 7, 2019

Related U.S. Application Data

(63) Continuation of application No. 15/338,396, filed on Oct. 30, 2016, now Pat. No. 10,397,628, which is a (Continued)

(51) Int. Cl.
*H04N 21/2662* (2011.01)
*H04N 21/2343* (2011.01)
(Continued)

(52) U.S. Cl.
CPC ..... *H04N 21/2662* (2013.01); *H04L 12/2852* (2013.01); *H04L 12/2878* (2013.01);
(Continued)

(58) Field of Classification Search
CPC ............. H04N 21/2662; H04N 21/222; H04N 21/2343; H04N 21/234363;
(Continued)

(56) References Cited

U.S. PATENT DOCUMENTS 6,996,129 B2  2/2006 Krause et al.
7,050,703 B2 * 5/2006 Ohta .................... H04N 5/21
                                                    348/E5.077
(Continued)

OTHER PUBLICATIONS

International Search Report of PCT/IB2009/55395 dated Jul. 15, 2010.

*Primary Examiner* — Kibrom T Hailu
(74) *Attorney, Agent, or Firm* — May Patents Ltd.

(57) ABSTRACT

A system and method for bandwidth management by controlling the bit rate of a signal stream in real time according to available link bandwidth. Applications include multiple-channel video data streams over a limited-bandwidth link such as a Digital Subscriber Line. A video signal is transrated at the head end to multiple streams having different bit rates, by a multirating device which sends the multiple streams over a network, along with metadata containing information about the data structure and parameters of the streams. At the network access edge, a demultirating device uses the metadata to select the stream with the highest video quality whose bit rate does not exceed the available bandwidth of the end-user's access link. This scheme provides multiple unicast signals to different end-users in place of a single multicast signal, supports multiple high-definition channels over a limited bandwidth link, and is compatible with standard encryption methods.

29 Claims, 10 Drawing Sheets

Related U.S. Application Data continuation of application No. 12/629,310, filed on Dec. 2, 2009, now Pat. No. 9,516,375.

(60) Provisional application No. 61/119,403, filed on Dec. 3, 2008, provisional application No. 61/119,033, filed on Dec. 2, 2008.

(51) Int. Cl.

| | | |
|---|---|---|
| *H04N 21/235* | (2011.01) | |
| *H04N 21/2389* | (2011.01) | |
| *H04N 21/239* | (2011.01) | |
| *H04N 21/24* | (2011.01) | |
| *H04N 21/63* | (2011.01) | |
| *H04N 21/6408* | (2011.01) | |
| *H04N 21/647* | (2011.01) | |
| *H04N 21/84* | (2011.01) | |
| *H04N 21/222* | (2011.01) | |
| *H04N 21/2362* | (2011.01) | |
| *H04N 21/435* | (2011.01) | |
| *H04L 12/28* | (2006.01) | |
| *H04L 29/06* | (2006.01) | |
| *H04L 12/64* | (2006.01) | |

(52) U.S. Cl.
CPC ......... *H04N 21/222* (2013.01); *H04N 21/235* (2013.01); *H04N 21/2343* (2013.01); *H04N 21/2362* (2013.01); *H04N 21/2389* (2013.01); *H04N 21/2393* (2013.01); *H04N 21/23439* (2013.01); *H04N 21/234363* (2013.01); *H04N 21/2402* (2013.01); *H04N 21/435* (2013.01); *H04N 21/631* (2013.01); *H04N 21/6408* (2013.01); *H04N 21/64738* (2013.01); *H04N 21/84* (2013.01); *H04L 63/0428* (2013.01); *H04L 2012/6478* (2013.01)

(58) Field of Classification Search
CPC ........... H04N 21/23439; H04N 21/235; H04N 21/2362; H04N 21/2389; H04N 21/2393; H04N 21/2402; H04N 21/435; H04N 21/631; H04N 21/6408; H04N 21/64738; H04N 21/84; H04L 12/2852; H04L 12/2878; H04L 63/0428; H04L 2012/6478

See application file for complete search history.

(56) References Cited

U.S. PATENT DOCUMENTS

| | | |
|---|---|---|
| 7,804,856 B2 | 9/2010 | Krause et al. |
| 7,831,729 B1 | 11/2010 | Eshet et al. |
| 7,835,437 B1 | 11/2010 | Zhang et al. |
| 7,844,992 B2 | 11/2010 | Boyce et al. |
| 7,913,277 B1 | 3/2011 | Rahrer |
| 7,864,808 B2 | 4/2011 | Krause et al. |
| 8,161,519 B2 | 4/2012 | Krause et al. |
| 8,776,161 B2 | 7/2014 | Gazier et al. |
| 8,887,218 B2 | 11/2014 | Fielibert et al. |
| 8,958,486 B2* | 2/2015 | Rodriguez ............ H04L 1/0041 375/240.13 |
| 2002/0191562 A1 | 12/2002 | Kumaki et al. |
| 2003/0200336 A1 | 10/2003 | Pal et al. |
| 2004/0105505 A1 | 6/2004 | Kitamura |
| 2005/0091696 A1 | 4/2005 | Wolfe et al. |
| 2005/0190794 A1 | 9/2005 | Krause et al. |
| 2005/0207569 A1 | 9/2005 | Zhang et al. |
| 2005/0271140 A1* | 12/2005 | Hanamura ............ H04N 19/187 375/240.12 |
| 2005/0276284 A1 | 12/2005 | Krause et al. |
| 2005/0289636 A1 | 12/2005 | Schiller |
| 2006/0067362 A1 | 3/2006 | Ramakrishnan |
| 2006/0171463 A1 | 8/2006 | Hanamura |
| 2006/0229992 A1 | 10/2006 | Morten |
| 2008/0072035 A1 | 3/2008 | Johnson et al. |
| 2008/0207137 A1 | 8/2008 | Maharajh et al. |
| 2008/0168118 A1 | 10/2008 | Hickey et al. |
| 2009/0046873 A1* | 2/2009 | Riedl ................. H04N 21/2335 381/107 |
| 2009/0138966 A1 | 5/2009 | Krause et al. |
| 2009/0201988 A1* | 8/2009 | Gazier ........... H04N 21/234309 375/240.06 |
| 2009/0207866 A1* | 8/2009 | Cholas ............... H04N 21/2541 370/505 |
| 2009/0293083 A1 | 11/2009 | Gordon |
| 2010/0017836 A1* | 1/2010 | Trojer ............... H04N 21/64322 725/114 |
| 2010/0118697 A1 | 5/2010 | Shumate |
| 2010/0135297 A1 | 6/2010 | Brousard et al. |
| 2010/0142601 A1* | 6/2010 | Flowers ................ H04M 3/304 375/222 |
| 2010/0253847 A1 | 10/2010 | Krause et al. |
| 2010/0061399 A1 | 11/2010 | Li |

\* cited by examiner

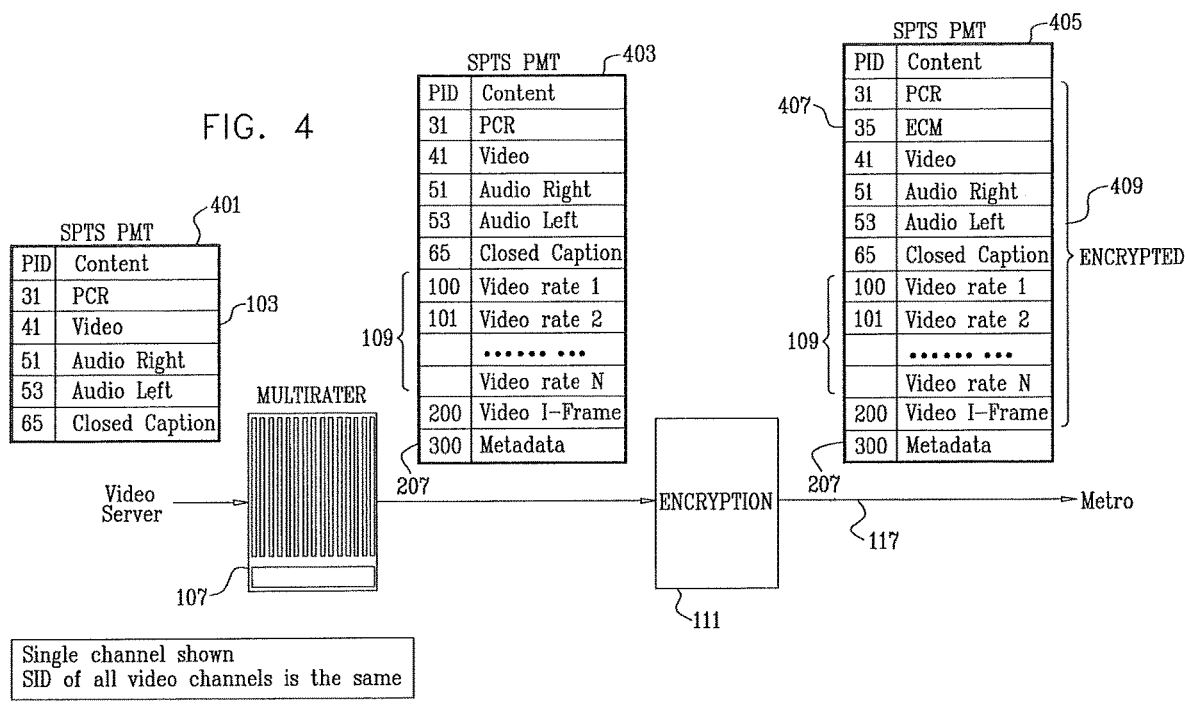

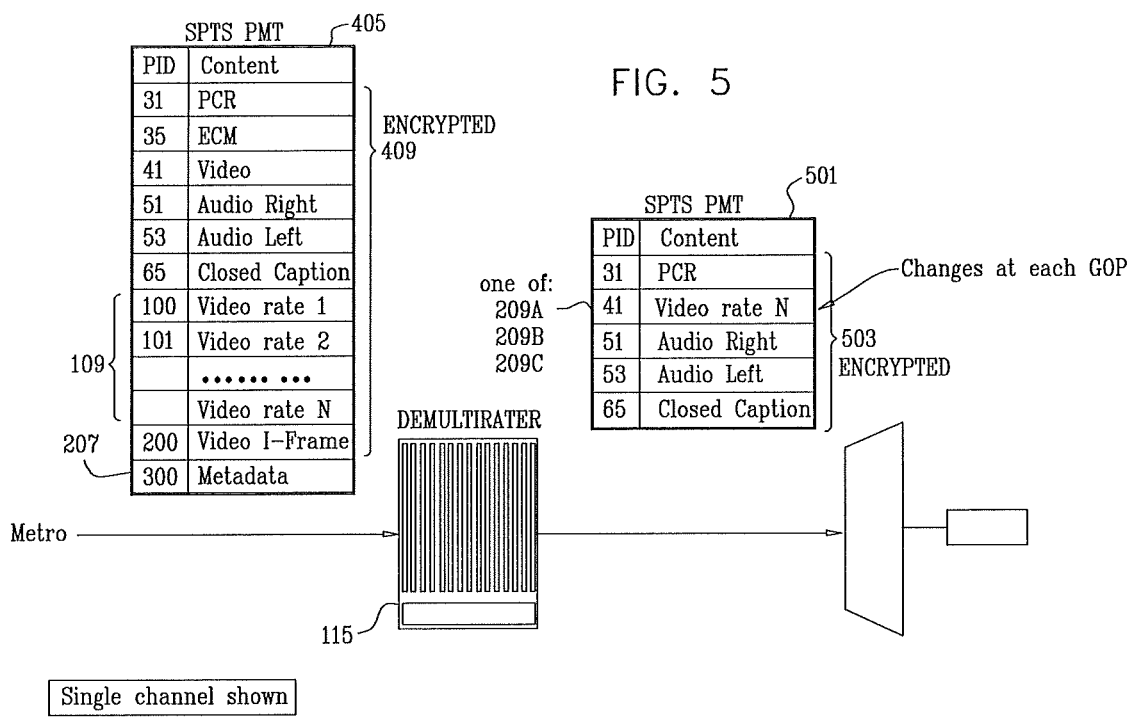

EDGE OPTIMIZED TRANSRATING SYSTEM

REFERENCE TO RELATED APPLICATIONS

This application is a continuation of U.S. patent application Ser. No. 15/338,396 filed on Oct. 30, 2016; which is a continuation of U.S. patent application Ser. No. 12/629,310 filed on Dec. 2, 2009 (now U.S. Pat. No. 9,516,375); which claims priority from U.S. Provisional Patent Application Ser. No. 61/119,033, filed Dec. 2, 2008; and U.S. Provisional Patent Application Ser. No. 61/119,403, filed Dec. 3, 2008, the disclosures of which are hereby incorporated by reference.

FIELD OF THE INVENTION

The present invention relates to bandwidth management of data streams, and, more particularly, to bandwidth management of a video signal over a bandwidth limited link, such as Digital Subscriber Line (DSL).

BACKGROUND OF THE INVENTION

The bandwidth of content being contributed to network users by service providers of metro and core networks is increasing rapidly. A main factor in this increase is new video services, especially High-Definition TV (HDTV). With modern compresion techniques (such as MPEG-4, H.264 and VC-1), HDTV can be transmitted at 8-9 Mbps, and a Standard-Definition TV (SDTV) channel at 2-1.5 Mbps.

The metro and core networks that provide connections between the head ends and the central offices are typically based on optical fiber infrastructures, so they are usually able to cope with this increase in bandwidth. The end-user access network, however, is typically based on twisted-pair copper wires over which Digital Subscriber Line (xDSL) technology is used to provide communication rates of up to 10 Mbps with Asymmetric Digital Subscriber Line 2 Plus (ADSL2+, also known as International Telecommunication Union standard G.992.5), which allows for a single HDTV channel.

The network is represented in hierarchical fashion, with the following layers:
  Core Layer
  Aggregation Layer (also referred to as the "Metro Layer")
  Access Layer The end-user is in the Access Layer. The term "access edge" herein denotes the boundary between the Aggregation Layer and the Access Layer of a network. As a non-limiting example, a Digital Subscriber Line Access Multiplexer (DSLAM) with ADSL2 output to a copper twisted pair medium, as described above, exists in the Access layer on the access edge. Other devices besides a DSLAM may be used to accomplish the processing necessary for delivering data to end-users; in the descriptions and drawings herein, a DSLAM is used only as a non-limiting example of such equipment, for purposes of illustration, and is not intended to restrict the present invention to any specific configuration or use.

Currently, the average number of television sets per household is between 2 and 3, often requiring multiple different HDTV channels simultaneously. As a result, video over xDSL may not have sufficient bandwidth to compete with cable and satellite offerings.

One solution is to bring optical fiber into the end-user's premises (or very close to it), but the capital investment required for such a solution is still very high.

SUMMARY OF THE INVENTION

The terms "transrating" and derivatives thereof are known in the art to denote a process in which data is coded to a lower bit rate without changing the data format. This allows given data to fit into smaller storage space and to be transmitted over a lower bandwidth channel.

According to embodiments of the present invention, a single video stream is transrated to multiple streams with different bit rates or different quality levels at the head end, and the multiple bit rate streams are transmitted to the end-user access edge along with metadata that indicates, among other qualitative and quantitative measures, the quality level and average rate or size for each stream of the channel during each Group of Pictures (GOP) or sub GOP, where a sub GOP can contain any number of pictures.

The terms "multirating" and derivatives thereof herein denote a process for performing transrating to multiple bit rates along with the generation of metadata descriptive thereof. Any device or combination of devices which performs multirating is herein denoted as a "multirater".

It is important to emphasize that the multiple transrated streams each contain the same content as the original single stream. The different multiple streams having different bit rates, however, carry the content with different levels of quality. The terms "content" and "end-user content" herein denotes information for end-user consumption, including, but not limited to: video, such as television programming, motion pictures, and the like; audio, such as music and voice, including telephonic communications; audio-visual material, combining audio and video; and data of interest to end-users, such as text, graphics, photographs, animations, games, interactive sessions, and the like.

The term "bandwidth" herein denotes the capacity for data transfer, expressed as a maximum data transfer rate in bits per second. The term "bit rate" herein denotes a nominal quantitative demand, request, or requirement for data transfer, expressed as a maximum data transfer rate in bits per second. In general, a device, network, or link thereof offers an available bandwidth; a signal to be transmitted or handled by such devices, networks, and links, has a required bit rate. Both bandwidth and bit rate are measured in the same units, such as bits per second. A signal having a specified numerical bit rate can be handled by a device, network, or link thereof which offers an available bandwidth equal to or greater than the specified numerical bit rate. It is also understood that the terms "bandwidth" and "bit rate" may be interchanged, because their numerical measures are both expressed in bits per second. It is noted that certain encoding schemes feature a variable bit rate (VBR) output, and in such cases the "bit rate" units expressed as a parameter for encoding is the nominal maximum bit rate of the output.

The term "bandwidth management" herein denotes the processing of a signal to alter or adjust the signal's bit rate in real time in order to comply with bandwidth limitations of media and/or equipment which handles or transmits the signal, while maintaining signal quality at the highest possible level consistent with the need to adapt the signal to the available bandwidth of the media and/or equipment involved.

The term "data stream", or "stream" (such as a "video stream") herein denotes an output comprising sequential units of data. A data stream may have a predetermined size or amount of data, but is not required to have a predetermined size. Typically, a data stream has a nominal maximum bit rate, but the instantaneous bit rate can vary in the case of VBR data streams. Non-limiting examples of data streams include: signals, such as signals transmitted over a link; computer data files output as file streams; and computer-generated data output as streams.

The terms "demultirating" and derivatives thereof herein denote a process for selecting portions of data streams from multiple data streams having different bit rates and sequencing the selected data stream portions into a single data stream. Any device or combination of devices which performs demultirating is herein denoted as a "demultirater".

According to embodiments of the present invention there is provided a system for bandwidth management of at least one data stream having end-user content, the system including: a multirating device having: a transrater operative, for each data stream of the data stream, to transrate the data stream into a plurality of transrated data streams in a single program transport stream (SPTS), each transrated data stream having the end-user content, and the plurality having different nominal maximum bit rates; and a metadata generator, operative to generate metadata which includes data structure and parameter information about the transrated data streams; and a demultirating device having: a receiver for receiving the plurality of transrated data streams of the SPTS; a selector, for receiving the metadata and an available bandwidth of at least one link, and for selecting a single transrated data stream of the plurality of transrated data streams responsively according to the metadata and the available bandwidth; and a sequencer for concatenating a segment of the single transrated data stream to a segment of a previously-selected data stream, to form a unicast data stream output to send to an end-user access link.

In addition, according to further embodiments of the present invention there is provided a method for bandwidth management over at least one link of a data stream having end-user content, the method including: transrating the data stream by a multirating device into a plurality of transrated data streams, each transrated data stream having the end-user content, and the plurality having different nominal maximum bit rates; generating, by the multirating device, metadata which includes data structure and parameter information about the transrated data streams; transmitting, to a demultirating device, the plurality of transrated data streams and the metadata; receiving, by the demultirating device, the plurality of transrated data streams and the metadata; selecting, by the multirating device, of a single transrated data stream of the plurality of transrated data streams responsively to the metadata and responsively to an available bandwidth of the link; and transmitting, by the multirating device of at least part of the single transrated data stream to the at least one link for transmission to an end-user.

BRIEF DESCRIPTION OF THE DRAWINGS

The present invention will be more fully understood from the following detailed description of the embodiments thereof, taken together with the drawings in which:

FIG. 4 illustrates a head end process according to an embodiment of the present invention.

FIG. 5 illustrates an edge process according to an embodiment of the present invention.

DETAILED DESCRIPTION OF THE EMBODIMENTS

Figure 1:
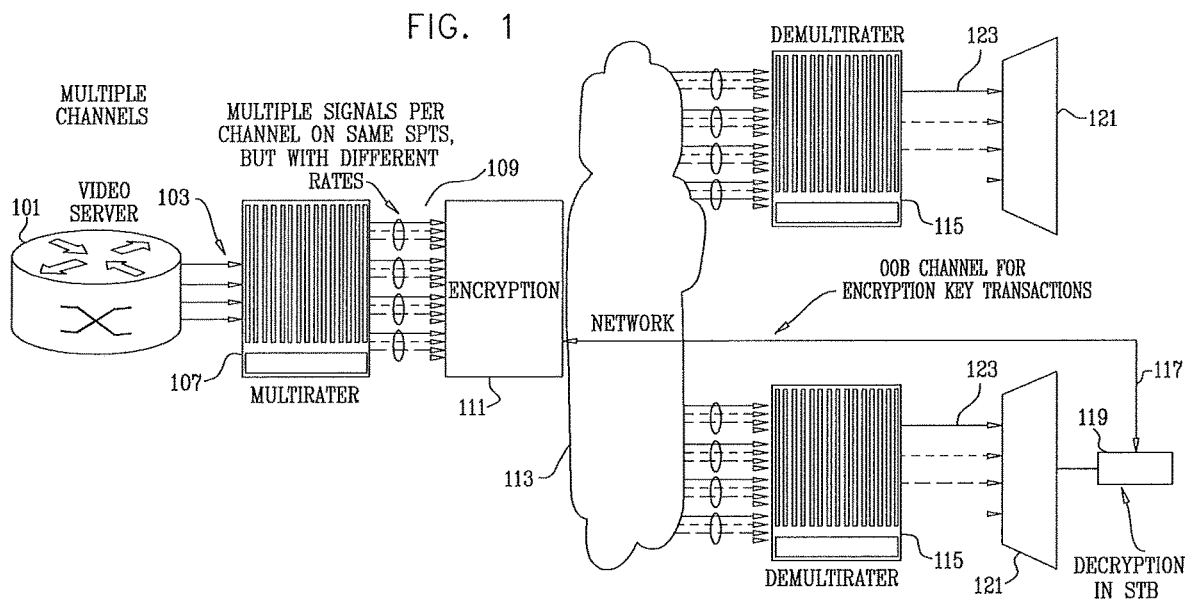
FIG. 1 conceptually illustrates the network environment of an embodiment of the present invention.

According to embodiments of the present invention, bandwidth management equipment of the central office at the access edge selects per GOP or per sub GOP, based on the metadata and currently-available bandwidth, the multi-rated channel signal having the maximum bit rate that can be used at the current available bandwidth without violating the end-users' constraints, taking into consideration the required quality. Further using the metadata generated by the multi-rater, the selected multirated signal channels are sequenced together into a single video stream. As detailed herein, embodiments of the present invention provide effective bandwidth management without requiring decryption at the access edge.

Devices according to certain embodiments of the present invention, multiraters and/or demultiraters are stand-alone devices. According to other embodiments of the present invention, multiraters and/or demultiraters are incorporated into other devices, including, but not limited to: video servers, DSLAMS, routers, switches, adn the like. According to still further embodiments of the present invention, multiraters and/or demultiraters are distributed among multiple devices, which in combination perform the various functions thereof. According to further embodiments, multiraters and demultiraters are implemented in processing devices via instructions which are executable thereby, wherein the executable instructions are stored in a manufactured computer product comprising tangible data storage media including, but not limited to: data storage devices; optical and magnetic storage media; and semiconductor memory storage devices, such as flash memory.

For clarity, a multirater and the operation thereof is generally described and illustrated herein for a single video channel. However, in embodiments of the present invention, a multirater may simultaneously handle multiple video channels; likewise, a demultirater may simultaneously handle multiple video channels.

A complete transrating system according to embodiments of the present invention includes both a multirater and a demultirater, which may be located in different physical locations and which may be connected to different parts of a network. In certain embodiments of the present invention, both multirater and demultirater operate simultaneously in real time for a broadcast signal. In other embodiments of the present invention for video-on-demand (VoD), multirating is performed off-line once for a particular video signal, and demultirating is performed on the associated multirated signals at one or more later times. Furthermore, in embodiments of the present invention, more than one demultirater may be employed to demultirate the signals from a single multirater.

Embodiments of the present invention are described and illustrated herein for bandwidth management in the non-limiting case of video signals at an access edge of Digital Subscriber Lines. However, it is understood that the principles of the present invention are applicable in more general cases to any streaming signals encoded in a format that permits different bit rates, and at network edges of any kind, without limitation.

The principles and operation of a bandwidth management method and system according to the present invention may be understood with reference to the drawings and the accompanying description.

FIG. 1. conceptually illustrates the network environment of an embodiment of the present invention. A video server 101 provides a video signal 103, which is a Single Program Transport Stream (SPTS), as defined in MPEG-TS; typically, there are multiple channels, each of which has a separate SPTS.

According to embodiments of the present invention, SPTS 103 is transrated into multiple signals within a single SPTS 109 by a multirater 107. The multiple signals within SPTS 109 correspond to the original video content transrated into multiple video signals with different bit rates, and having different video qualities depending on the bit rate. The expansion process and the resulting data structures thereof are discussed in detail below.

SPTS 109 is sent over a network 113 to a demultirater 115, which produces bandwidth-managed signals for the end users. Network 113 can be any suitable data network, typically a metropolitan network.

From demultirater 115, an SPTS 123 is sent to a DSLAM or equivalent device 121 through a 1GBE interface, for example, and to an end-user device 119. SPTS 123 is a sequential composite of different bit rate signals selected and combined by demultirater 115 according to available bandwidth considerations, and is delivered to end-user device 119 over copper twisted pair lines using ADSL2+ technology for device 121.

Bandwidth Management

Forwarding all video channels to a DSLAM will overwhelm the DSLAM's 1 GBE interface, so Internet Group Management Protocol (IGMP) snooping techniques are typically used to limit the channels forwarded to the DSLAM to the actual channels being viewed by the end-user. As previously noted, however, consumer trends indicate that a single end-user may require multiple simultaneous HDTV video channels. Under normal conditions, this would exceed the available bandwidth of the xDSL interface regardless of IGMP snooping techniques.

To handle this situation, the present invention provides managing the bandwidth demand of a channel to insure that the channel's bandwidth demand does not exceed the bandwidth resources available for the channel.

Transrating for Bandwidth Management

Figure 2:
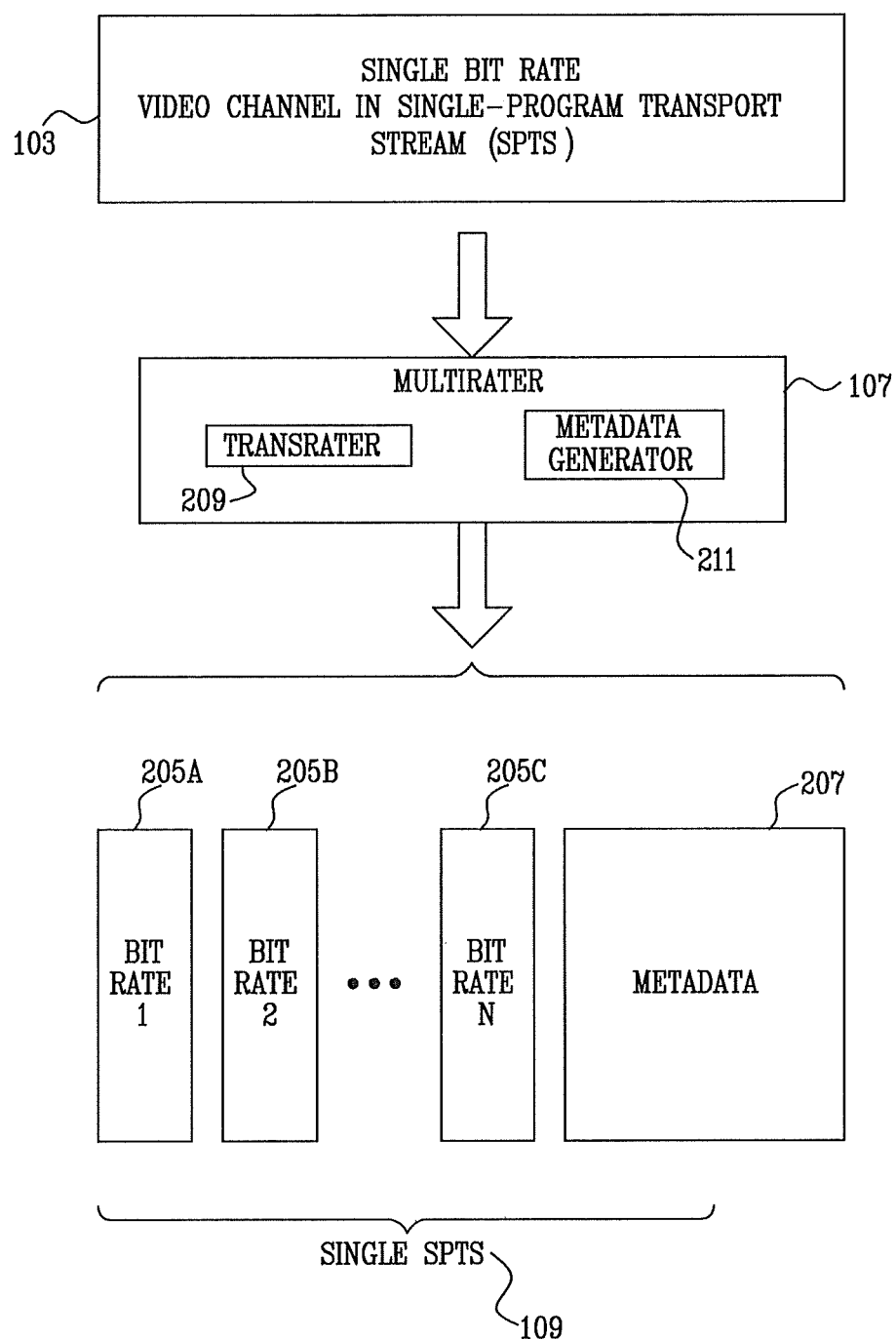
FIG. 2 conceptually illustrates generating multiple signals having different bit rates and metadata corresponding thereto by a multirater according to an embodiment of the present invention.

FIG. 2. conceptually illustrates the structure of multiple elementary streams of a channel in a single SPTS according to embodiments of the present invention.

Single bit rate video channel SPTS 103 is used as the source of multiple transrating operations to generate, via multirater 107, a signal 205A having a bit rate or quality 1, a signal 205B having a bit rate or quality 2, and a signal 205C having a bit rate or quality N, all of which are included in SPTS 109. Multirater 107 comprises a transrater 209 and a metadata generator 211. It is noted that the bit rate property is useful for Constant Bit Rate (CBR) streams, whereas the quality property is useful for Variable Bit Rate (VBR) streams.

In one embodiment of the present invention for handling real-time broadcast SPTS 103, multirater 107 is included in video server 101. In another embodiment for handling a Video on Demand (VoD) SPTS, multirater 107 is included in a VoD server (not shown). In still another embodiment, multirater 107 is a separate stand-alone device.

For employing the present invention, the principal difference between real-time broadcast and VoD is that for real-time broadcast the generating of signals 205A, 205B, and 205C and metadata 207 in SPTS 109 is also done in real-time during the broadcast of SPTS 103, whereas for VoD the generating of the signals and metadata is done off-line, and need be done only once prior to the delivery of any signals. For VoD, processed SPTS 109, in place of, or alternatively in addition to, source SPTS 103, is kept in memory or data storage for delivery to the end-user.

In embodiments of the present invention, metadata 207 provides indications and quantitative estimates indications of the influence of bit rate on the perceived subjective quality of the video signals. Metadata 207 contains information about the data structure and parameters of the video signals, and may include, but is not limited to, the following indications and measurements for each of the video signals:

overall video quality level;
 bandwidth consumed by the signal's video stream;
 overall visual noise, spurious edges, localized motion distortion, and localized spatial distortion;
 image structural similarities (SSIM);
 peak signal to noise ratio (PSNR);
 Group of Picture (GOP) parameters; and
 statistics on moving vectors, macroblock types, and density.

FIG. 2 is exemplary of transrating according to the present invention, and the ellipsis ( . . . ) indicates that additional signals at additional bit rates may also be generated. Also generated is metadata 207, which contains information for handling, using, and combining signals 205A, 205B, and 205C in managing the bandwidth demand of a signal. In an embodiment of the present invention, metadata 207 is included in SPTS 109; in an other embodiment of the present invention (such as embodiments utilized with encryption, as detailed below), metadata 207 is sent unencrypted; in still a further embodiment of the present invention, metadata 207 is sent over an out-of-band (OOB) channel (not shown).

Any encoding scheme that offers an adjustable encoded bit rate for the encoded data output may be used with the present invention, including, but not limited to MP3 and MPEG-x.

By providing a set of transrated signals having different bit rates, the present invention offers fast, cost effective bandwidth management. At the access edge, a single transrated signal is selected from multiple signals 205A, 205B, 205C of SPTS 109, such that the bit rate of the selected transrated signal can be handled by the currently-available bandwidth of the xDSL interface. As the available bandwidth of the xDSL interface continually changes, corresponding selections of the signal from multiple signals 205A, 205B, 205C of SPTS 109 are continuously made to adjust the signal sent over the xDSL to the available bandwidth thereof. Because the multiple signals 205A, 205B, 205C, etc. all correspond to the same video channel and carry the same content (albeit at different levels of quality, depending on the bit rate), switching from one of the multiple signals to another does not result in any breaks or discontinuities in the video content delivered to the end-user. Use of metadata 207 insures that the transitions from one signal to another is done seamlessly and without disruption of the video content.

Using Encryption with the Transrating System

SPTS 109 may optionally undergo encryption via an encryption unit 111 before being sent over network 113. Encryption-related data to enable proper user decryption is typically sent over an Out-of-Band (OOB) channel 117. At the end-user destination, a Set Top Box (STB) 119 handles the decryption.

According to embodiments of the present invention which are utilized with encryption, metadata 207 is not encrypted, but is indicated by a special packet ID (PID) and is sent in clear, so that equipment in the Aggregation Layer can utilize metadata 207 without decryption in generating unicast signals, as detailed herein. In practical terms, metadata 207 carries no content information, so there is no need for encryption of metadata 207.

As suggested by FIG. 1, the transrating technique of the present invention is fully compatible with standard industry encryption methodology—SPST 109 is encrypted by encryption unit 111 before being sent over network 113, and is decrypted by STB 119 after being delivered by network 113, in exactly the same manner as regular prior-art video content signals. This is an important benefit of the present invention, because it is difficult to perform video processing on encrypted signals. Channels are typically encrypted for transport over the network, and content providers are usually reluctant to allow decryption in the network. This is why a video signal is typically encrypted before being put on the network, and is decrypted only at the end-user's premises. In effect, then no video processing is normally possible until the signal is received and decrypted by the end-user's STB, by which time it is too late to process the signal for bandwidth management purposes. The present invention overcomes this restriction, as will be clear from the descriptions herein.

Using Statistical Multiplexing with the Transrating System

Embodiments of the present invention are compatible with statistical multiplexing techniques. Encoded video signals using Variable Bit Rate (VBR) usually have a large variance in instantaneous bit rate, depending on the content of the frame being encoded. This variance can be used to statistically multiplex different channels over the same connection to increase the number of channels. Statistical multiplexing, however, is usually insufficient to gain the required effective bandwidth, especially for connections carrying a low number of channels.

Bandwidth management provided by embodiments of the present invention can be used in conjunction with statistical multiplexing, or in place thereof. When statistical multiplexing is used in conjunction with embodiments of the present invention, the available bandwidth of the xDSL interface will depend on the parameters of the statistical multiplexing, and will be taken into account when selecting the particular signal to transmit over the xDSL from among multiple signals 205A, 205B, 205C of SPTS 109.

The advantages offered by the present invention include:
Multirating is performed only once, at the head end.
Equipment located before the access edge performs only demultirating.
There is no increase in the content bandwidth sent to the DSLAM. A single channel that complies with all constraints of the end users and the available bandwidth is forwarded to the DSLAM.
There is no impact on standard encryption schemes.
The best possible video signal sent to the end-users, according to instantaneous constraints.

Figure 3A:
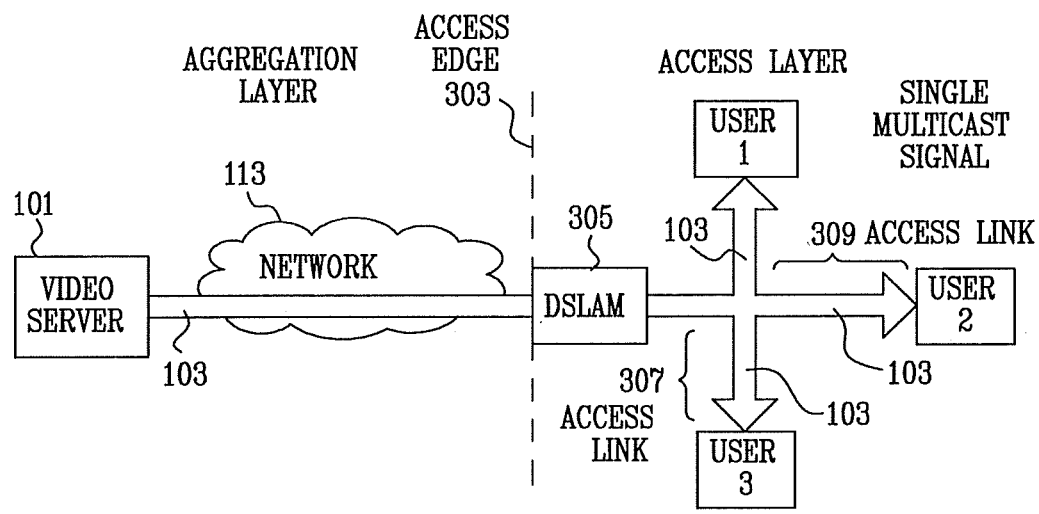
FIG. 3A conceptually illustrates a prior-art video network multicast technique, whereby the same signal is sent to multiple end-users.

FIG. 3A illustrates prior-art multicasting of video signals. Video server 101 sends SPTS 103 over network 113 to a DSLAM 305 at an access edge 303. The same data stream, SPTS 103 is sent to all end-users. For example, User 3 on an access link 307 receives SPTS 103, and User 2 on a different access link 309 also receives SPTS 103.

Figure 3B:
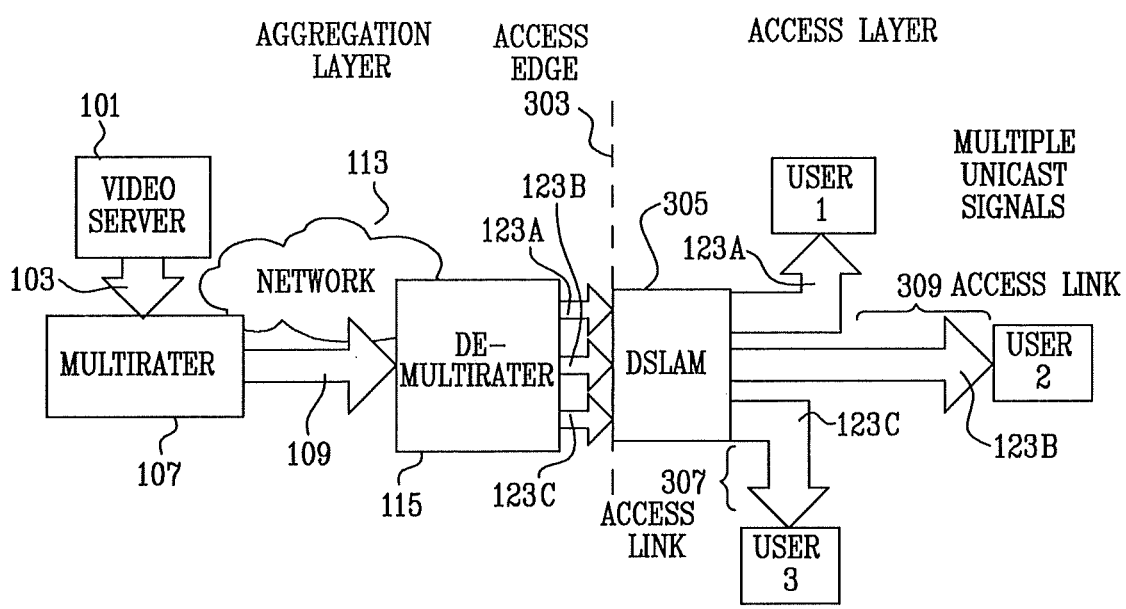
FIG. 3B conceptually illustrates a unicast technique according to embodiments of the present invention, whereby a different, customized signal is sent to each end-user.

FIG. 3B illustrates unicasting of video signals according to embodiments of the present invention. Video server 101 sends SPTS 109 over network 113 to demultirater 115 at access edge 303. SPTS 109 is as shown in FIG. 2 and as described previously. In an embodiment of the present invention demultirater 115 processes SPTS 109 to generate multiple different unicast signals 123A, 123B, and 123C to send to different end-users. Unicast SPTS data streams 123A, 123B, and 123C are each generated to suit the available bandwidth for their respective destinations. For example, User 3 on access link 307 receives SPTS 123C, whereas User 2 on access link 309 receives a different SPTS 123B.

FIG. 4 illustrates a head end process according to embodiments of the present invention. The head-end equipment receives video signal 103 (see FIG. 2) from the source in unencrypted form. As previously noted, the source is typically either a broadcaster or a VoD server.

Each channel is on a separate Single Program Transport Stream (SPTS) as defined in MPEG-TS. This stream usually includes a single video stream, one or more audio streams, and one or more closed caption streams. Also included is a Program Map Table (PMT) 401, which relates each of the different content streams to a unique packet ID (PID), as shown in table 401.

According to embodiments of the present invention as previously discussed, the head end equipment decodes video signal 103 and re-encodes it into multiple signals, employing the same coding scheme, but at a different bit rate for each of the signals. The head end equipment also creates metadata 207 that indicates the minimum required bandwidth per each GOP, and the GOP boundaries. The different bit rate video signals are multiplexed into SPTS 109, as previously described, and a new PMT 403 is generated. PMT 403 also includes the other streams unaltered (audio, closed caption, etc.), as well as metadata 207. It is noted that the different bit rate streams of SPTS 109 each have their own PID, as indicated in PMT 403.

When encryption is utilized, the encryption is done at the head end by encryption unit 111 (as also shown in FIG. 1). SPTS 109 is forwarded to encryption unit 111 (at the MPEG-TS payload level). The encrypted signal is forwarded to the metro/core network.

In this case, an additional new PMT 405 is generated. A content group 409 within PMT 405 includes the encrypted content streams. Also included in PMT 405 is a new stream for Entitlement Control Messages (ECM) 407, to enable authorized end-users to decrypt content. ECM 407 used by Set Top Box (STB) 119 (FIG. 1) to decrypt the signal.

As previously noted, metadata 207 is not encrypted, in order for the edge equipment to create a unicast signal for the end-user without having to perform any decryption, according to embodiments of the present invention. Metadata 207 is given a special PID, as shown.

FIG. 5 illustrates the process prior to the access edge according to embodiments of the present invention. At the central office the edge equipment receives SPTS 109 and PMT 405, and takes into consideration all end-user constraints as well as the minimum required bandwidth for each channel. The edge equipment selects for each GOP the video signal (205A, 205B, 205C, as shown in FIG. 2) having the maximum bit rate that complies with all the constraints. The selected video signal (one of: 205A, 205B, 205C) becomes part of a new PMT 501 which is sent to the end-user, with a group 503 encrypted. As noted previously, the selected signal (one of: 205A, 205B, 205C) changes in time as the available bandwidth changes. Note that metadata 207 is not included in PMT 501, because demultirater 115 has already made use of metadata 207 in selecting the video signal to send to the end-user.

Figure 6:
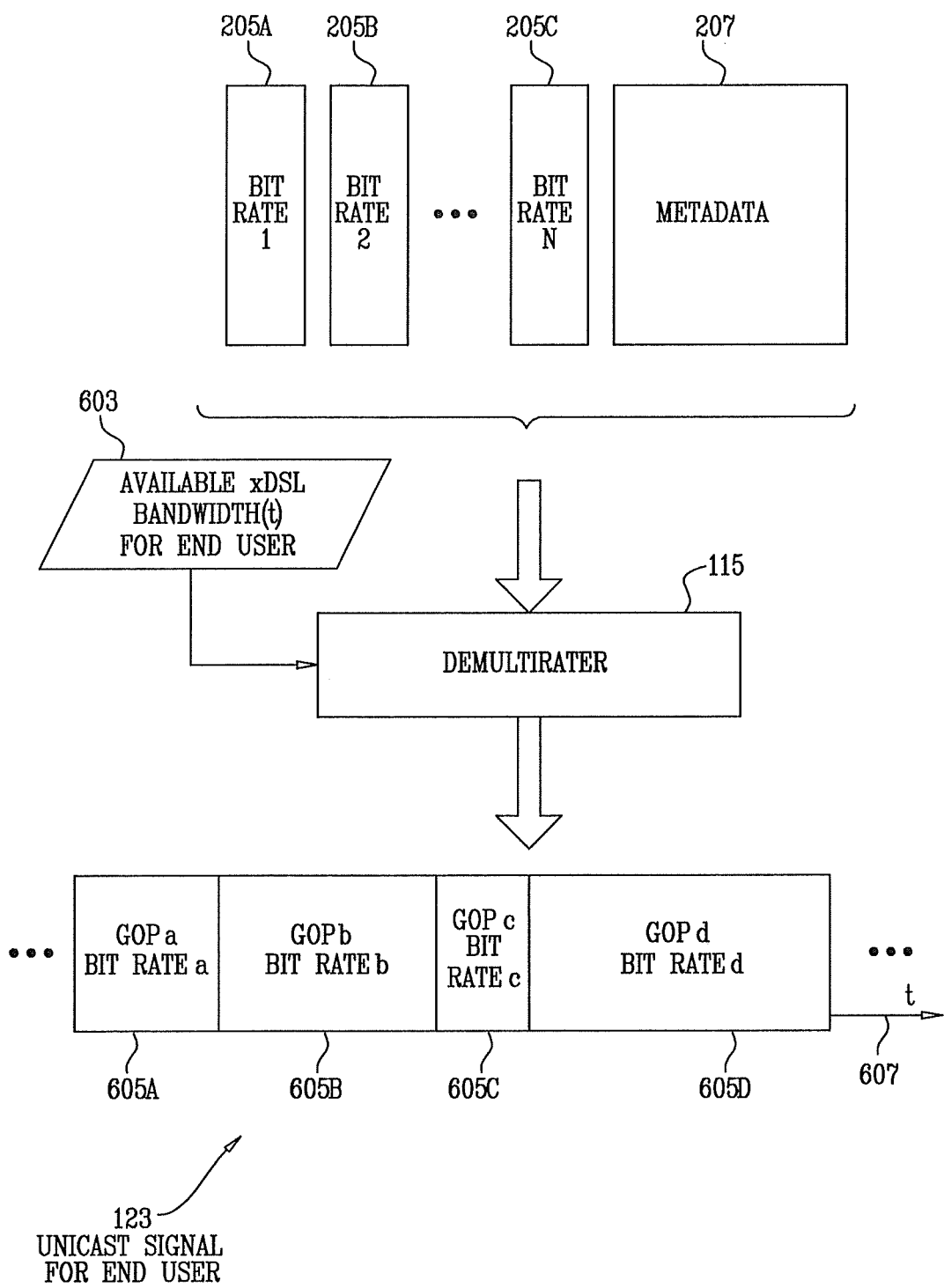
FIG. 6 illustrates the generating of a unicast signal for an end-user in the Access Layer, by a demultirater according to an embodiment of the present invention.

FIG. 6 illustrates the generating of a unicast signal for an end user in the Access Layer, by demultirater 115 according to an embodiment of the present invention. Demultirater 115 selects one of signals 205A, 205B, and 205C according to the currently-available xDSL bandwidth for the end user at time t, where the available xDSL bandwidth varies from one time t to another; i.e., the available bandwidth is a function of time BANDWIDTH (t). The selection is made based on which of signals 205A, 205B, and 205C offers the best quality video consistent, while also not exceeding the available bandwidth. Demultirater 115 also utilizes metadata 207 to properly time-position the transitions from one signal to another.

The output of demultirater 115 is a unicast data stream 123 for the end-user, where unicast data stream 123 is made up of sequential segments of different bit rates for sequential Groups of Pictures which are concatenated together to form a continuous data stream 123, an exemplary portion of which is shown in FIG. 6 as 605A, 605B, 605C, and 605D along a time axis 607. The term "segment" herein denotes at least a part of a selected data stream (one of 205A, 205B, and 205C in FIG. 6).

Figure 7:
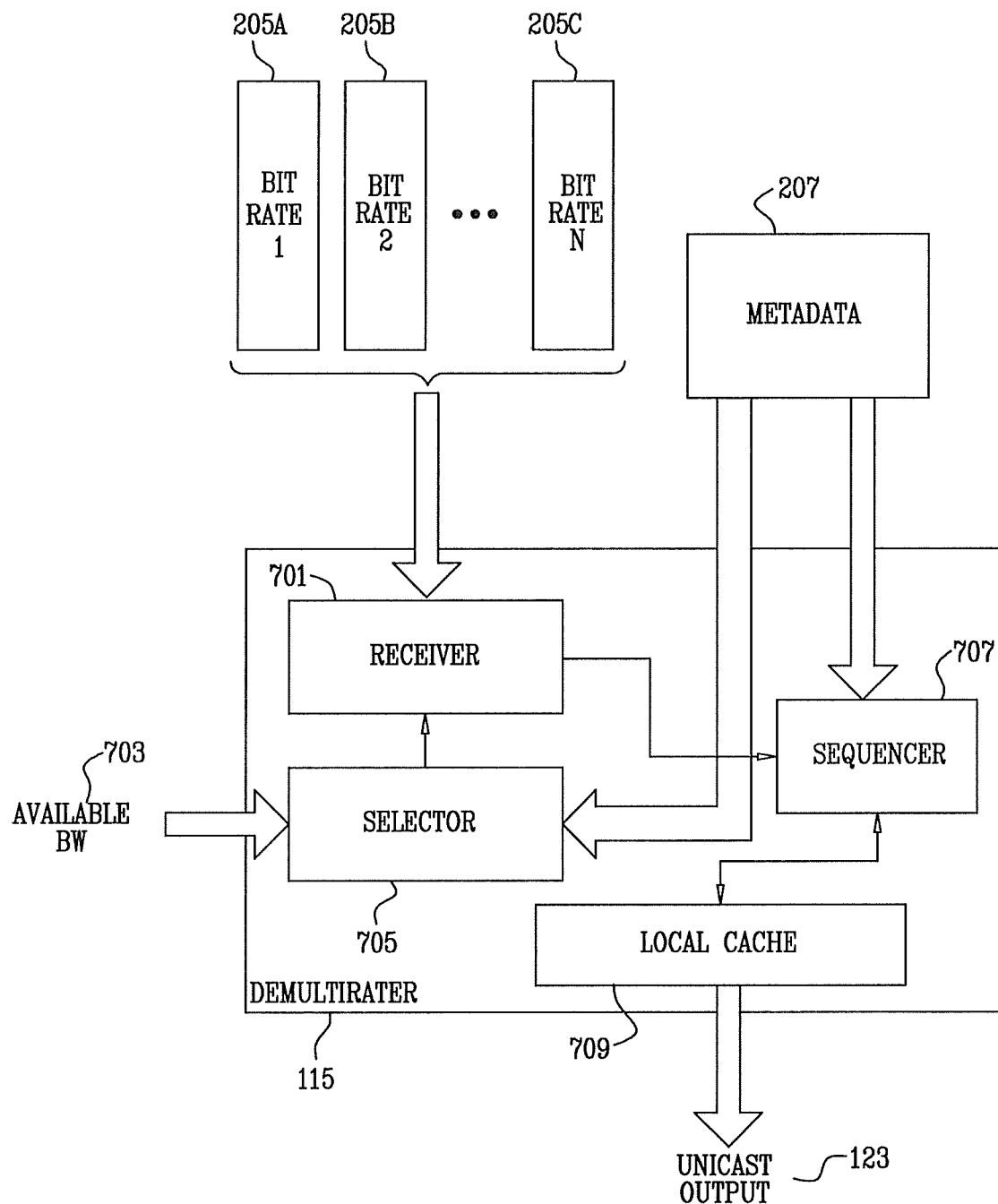
FIG. 7 is a block diagram of a demultirater according to an embodiment of the present invention.

FIG. 7 is a block diagram of demultirater 115 according to an embodiment of the present invention, in which demultirater 115 includes a receiver 701 for receiving multiple data streams 205A, 205B, and 205C having different bit rates as shown. A selector 705 takes input from available bandwidth 703, which is the available bandwidth of an access link (such as access links 307 and 309 in FIGS. 3A and 3B), and from metadata 207 to select one of multiple data streams 205A, 205B, and 205C from receiver 701. The selection is made according to the optimal maximum bit rate, such as computed by methods detailed below. According to embodiments of the present invention, the data stream which has the highest quality of the data streams with a bit rate that does not exceed the optimal maximum bit rate is selected. The selected data stream is delivered to a sequencer 707. As the available bandwidth changes in time, sequencer 707 concatenates a segment of the currently-selected data stream to a segment of the previously-selected data stream as illustrated in FIG. 6 and as discussed previously. A local cache 709 buffers the concatenation process if necessary. The concatenated data stream is output as unicast data stream 123 to an end-user access link for delivery to an end-user.

Constant Demultirating

In an embodiment of the present invention, a demultirating process performs a predetermined constant selection of one of signals 205A, 205B, and 205C. In this embodiment, the unicast signal output from a demultirater is a stream having an encoded bit rate that does not change in time. It is noted that the demultirated output does not necessarily have a constant instantaneous bit rate, because encoding schemes featuring a selectable bit rate are typically variable bit rate schemes, where the instantaneous bit rate depends on the content. What is constant in this embodiment of the present invention is the encoded bit rate. As previously noted, an encoded stream may have a constant bit rate (CBR) or variable bit rate (VBR) with constant quality.

This particular embodiment of the present invention is useful in situations where the available bit rate is known in advance, and where the time-variation in the available bit rate does not affect the choice of the demultirated signal.

Methods for Bandwidth Management in Multi-User/Multi-Program Environments

Embodiments of the present invention provide methods for bandwidth management, by computing the proper bit rate to use for selecting from among signals 205A, 205B, and 205C, as shown in FIG. 6, particularly in multi-user and multi-program environments.

For methods detailed herein, the following definitions apply:
- access link—a physical link (such as DSL, shown as access links 307 and 309 in FIGS. 3A and 3B) used to transport multiple programs to multiple STB's at an end-user's physical location.
- AccessRate—the available bandwidth (in bits per second) provided by the access link.
- Weight (program)—a value assigned to express the importance of a given program relative to other programs.
- ReqRate (program)—the predetermined recommended bit rate that the current GOP requires to maintain acceptable quality of program.
- MaxRate (program)—the highest stream bandwidth available on the network for program.
- MinRate (program)—the lowest stream bandwidth available on the network for program.
- NominalRate (program)—the calculated bit rate that program is allowed to consume under the link available bandwidth, in combination with other programs.

According to embodiments of the present invention, the following factors are taken into account, at least some of which may be included in metadata 207 (FIG. 2):
- end-users' allowed rate
- viewed channel combinations
- channel required rate
- number of viewers per channel
- relative weights assigned to the channels In general, methods according to the present invention iterate over at least the following in nested loops:
- End-user access links; and
- Program (channel) viewed through an access link.

Additional processing loops may be initiated by events such as:
- Elapsing of a predetermined time interval; and
- Changes in recommended bit rate.

Methods according to embodiments of the present invention are performed by processing devices, non-limiting examples of which include: computers, servers, routers, switches, DSLAMs, and demultiraters as disclosed herein.

The detailed methods discussed and illustrated below are examples of how the above definitions and variable quantities are used according to embodiments of the present invention, for bandwidth management. It will be appreciated by those skilled in the art that the following embodiments are non-limiting, and that variations, modifications, and combinations of the following methods are possible.

Figure 8:
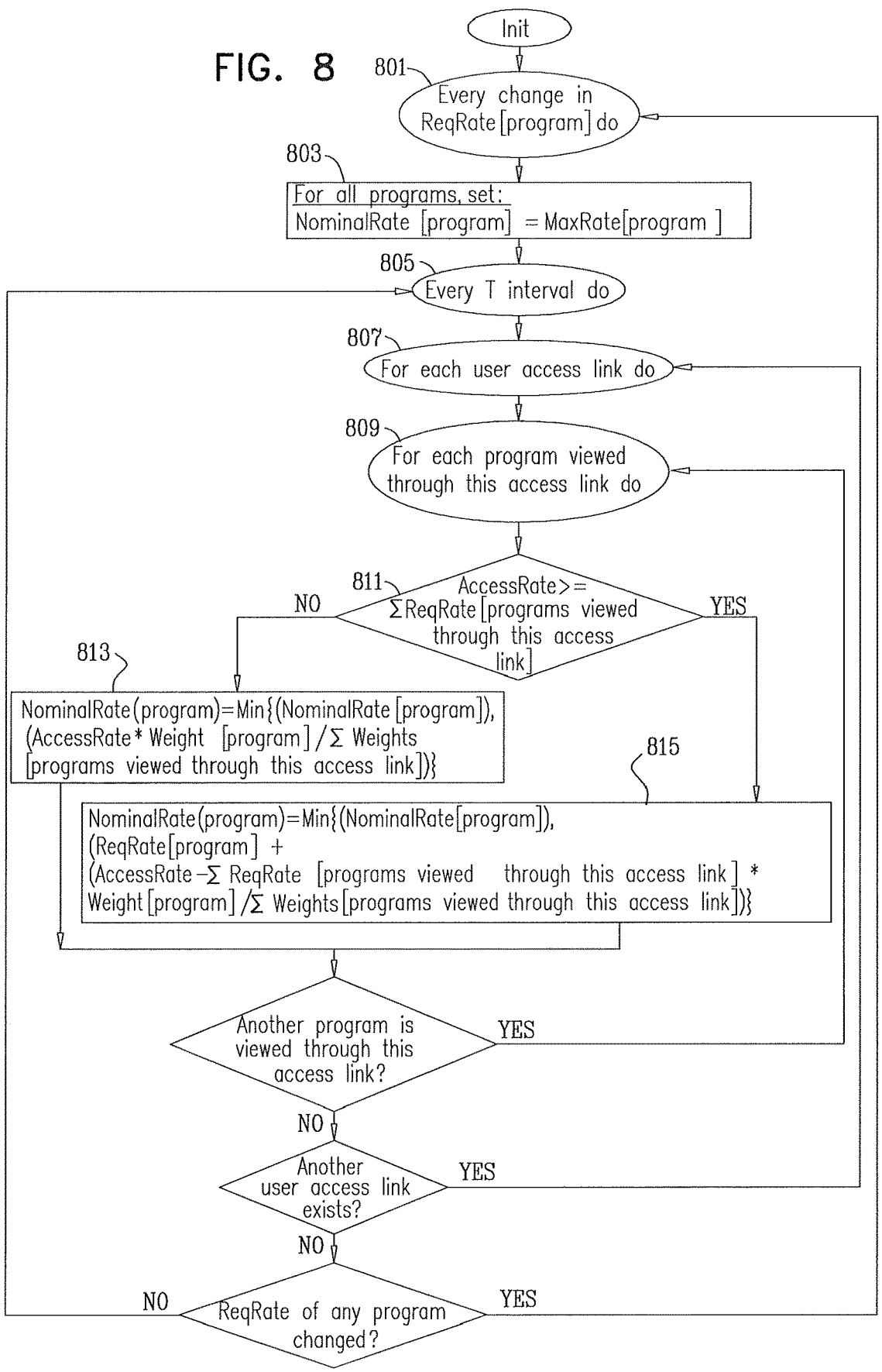
FIG. 8 is a flow chart of a method according to a first preferred embodiment of the present invention.

FIG. 8 is a flow chart of a bandwidth management method according to a first preferred embodiment of the present invention.

The method of FIG. 8 contains the following nested loops: a loop having an entry point 801, which is triggered for each change in the requested bit rate, per ReqRate (program), with an initialization step 803; a loop having an entry point 805, which is triggered for every time interval T (i.e., the process of selecting of one of signals 205A, 205B, and 205C is repeated after a predetermined time interval has elapsed); a loop entry point 807, which iterates for each end-user access link (in the case of multiple end-users); and a loop having an entry point 809, which iterates for each program (video channel) viewed through the end-user access link of loop entry point 807.

A decision point 811 then determines whether the available bandwidth, per AccessRate, is at least as great as the summation of all requested bit rates.

If the available bandwidth can handle the requested bit rates, then NominalRate (program) is calculated for each program according to a step 815.

Otherwise, if the available bandwidth is insufficient to handle the requested bit rates, then NominalRate (program) is calculated for each program according to a step 813.

Figure 9:
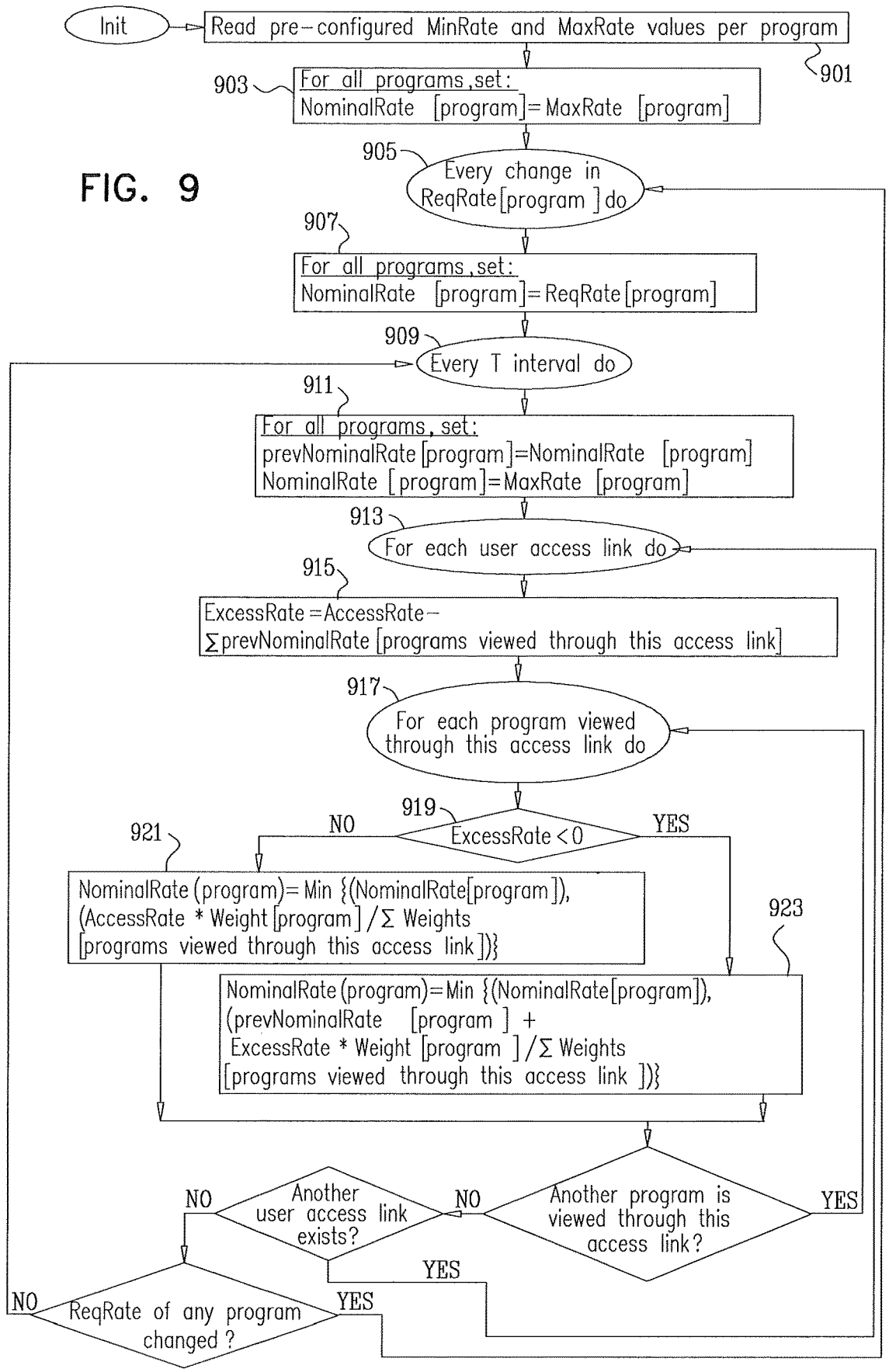
FIG. 9 is a flow chart of a method according to a second preferred embodiment of the present invention.

FIG. 9 is a flow chart of a bandwidth management method according to a second preferred embodiment of the present invention.

In initialization steps 901 and 903, ReqRate (program) is set for all programs (video channels). The method of FIG. 9 contains the following nested loops: a loop having an entry point 905, which is triggered for each change in the requested bit rate, per ReqRate (program), with an initialization step 907; a loop having an entry point 909, which is triggered for every time interval T, with an initialization step 911; a loop entry point 913, which iterates for each end-user access link (in the case of multiple end-users), with an initialization step 915 which defines and initializes an ExcessRate variable for each access link; and a loop having an entry point 917, which iterates for each program (video channel) viewed through the end-user access link of loop entry point 913.

A decision point 919 then determines whether ExcessRate is less than zero. If so, then NominalRate (program) is calculated for each program according to a step 921. Otherwise, NominalRate (program) is calculated for each program according to a step 923.

Figure 10:
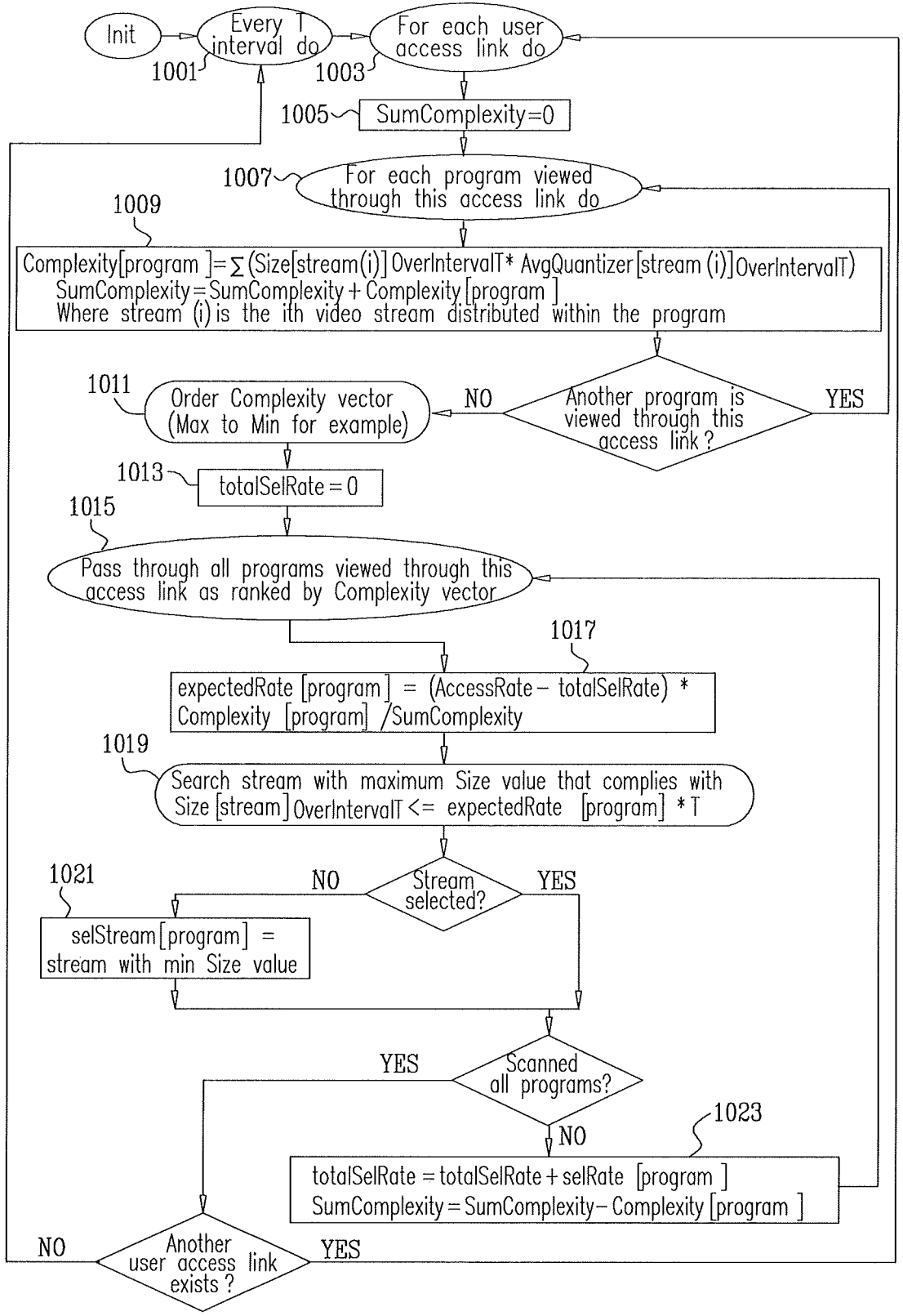
FIG. 10 is a flow chart of a method according to a third preferred embodiment of the present invention.

FIG. 10 is a flow chart of a bandwidth management method according to a third preferred embodiment of the present invention. In this embodiment, programs are evaluated according to the measures of subjective video quality that reflect human visual characteristics regarding the influence of bit-rate, quantizers, structural similarity (SSIM), peak signal to noise ratio (PSNR) statistics on moving vectors, statistics on macroblocks types and density, overall noise, spurious edges, localized motion distortion, or localized spatial distortion.

For this method, the following additional definitions apply:

Stream (i)—the ith stream number among the different transrated stream rates (e.g., 205A, 205B, 205C, as shown in FIG. 2) for a program (channel).

AvgQuantizer[stream (i)]—the average quantizer (may be a weighted average) calculated over stream (i) during a time interval T.

Size[stream (i)]$_T$—the size of stream (i) over a time interval T.

Complexity[program]—a measure of the complexity of the program. The higher the complexity, the higher is the bandwidth required to maintain program quality.

A loop having an entry point 1001 is triggered for every time interval T. A loop having an entry point 1003 iterates for each end-user access link. In an initialization step 1005, a variable SumComplexity is set to zero. A loop having an entry point 1007 iterates for each program viewed through the currently-iterated access link. In a step 1009, Complexity [program] is computed according to AvgQuantizer[stream (i)], and SumComplexity is updated. In a step 1011, a programs are ranked in order of Complexity[program], and in ar initialization step 1013, a variable totalSelRate is set to zero.

At a loop entry point 1015 programs viewed through the currently-iterated access loop are iterated in order of complexity as ranked by Complexity[program].

In a step 1017, a variable expectedRate[program] is computed, and in a step 1019 a stream is selected, if possible, whose size over the time interval T is less than or equal to expectedRate[program]*T. If a stream cannot be selected according to this criterion, in a step 1021 the stream with the minimum size is selected. At the end of the loop begun at entry point 1015, totalSelRate and SumComplexity are updated.

Additional methods for multiplexing channels over an access link (such as xDSL) can be based on SSIM or PSNR values. These methods would involve generating histograms of SSIM or PSNR values over interval T, calculating the mean and standard-deviation values, and statistically computing acceptable SSIM or PSNR scores within the available streams.

Computer Product

A further embodiment of the present invention provides a computer product for performing a method disclosed in the present application or any variant derived therefrom.

A computer product according to this embodiment includes a set of executable commands for a computer within tangible data storage including, but not limited to: computer media, such as magnetic media and optical media; computer memory; semiconductor memory storage; flash memory storage; data storage devices and hardware components; and a computer or communications network. The terms "perform", "performing", etc., and "run", "running", when used with reference to a computer product herein denote that when the executable commands within the computer product are executed, the computer product causes the computer to perform the predefined actions.

The term "computer" herein denotes any data processing apparatus capable of, or configured for, executing a set of executable commands to perform a method, including, but not limited to: computers; workstations; servers; gateways; routers; multiplexers and demultiplexers; modulators and demodulators; switches; networks; processors; controllers; digital appliances; and other devices capable of processing data. Devices according to the present invention, along with the components thereof (including, but not limited to multirater 107 and demultirater 115), may be implemented in dedicated hardware, via software in general-purpose hardware, or by a combination thereof.

While the invention has been described with respect to a limited number of embodiments. it will be appreciated that many variations, modifications and other applications of the invention may be made.

The invention claimed is:

1. A device for carrying video data from a video source via a first packet-based network to a video display over a second network, the first network carrying a first video stream in a data format from the video source and a one or more second video stream having a lower bit rate and the data format, translated from the first video stream using a multirater or a transrater, the device comprising:
- a receiver for receiving the video streams from the first network;
- a selector for selecting one of the first and the second video stream;
- a transmitter for transmitting the selected video stream to the second network; and
- a single enclosure housing the receiver, the selector, and the transmitter,
- wherein the second network is configured to transporting data streams up to a maximum bit rate, and
- wherein the selecting of the video stream comprises selecting the video stream associated with the highest bit rate that is lower from the maximum bit rate.

2. The device according to claim 1, further operative to select the second video stream, and the device further comprising a demultirater for reconstructing the first video stream from the second video stream.

3. The device according to claim 1, further comprising a multiplexer, and wherein the selecting comprises de-multiplexing of the second video stream.

4. The device according to claim 3, wherein the multiplexer is a statistical multiplexer, and wherein the selecting comprises statistical de-multiplexing.

5. The device according to claim 1, further comprising a router, a switch, a multiplexer, or a server.

6. The device according to claim 1, further comprising a software stored in a tangible data storage medium, and a processor for executing the software.

7. The device according to claim 1, further comprising a sequencer coupled between the selector and the transmitter for forming a unicast data stream that comprises the selected video stream.

8. The device according to claim 7, further comprising a cache coupled for buffering the unicast data stream between the sequencer and the transmitter.

9. The device according to claim 1, wherein the first network is a Metropolitan Area Network (MAN) or a core network, or wherein the first network implements a core layer or an aggregation layer.

10. The device according to claim 1, wherein the first network uses a medium that is based on, comprises, or uses, an optical fiber.

11. The device according to claim 1, further comprising an Ethernet interface for connecting to the first network.

12. The device according to claim 11, wherein the Ethernet interface consists of, comprises, or is compatible with, a Gigabit Ethernet (1 GbE) that is according to, based on, or compatible with, IEEE 802.3-2008 standard.

13. The device according to claim 1, wherein the second network is an access network or implements an access layer.

14. The device according to claim 13, wherein the second network uses medium that uses, is based on, or comprises, a twisted wire pair.

15. The device according to claim 14, wherein the second network uses, is based on, or comprises, a point-to-point connection.

16. The device according to claim 15, wherein the second network uses, is based on, or comprises, Digital Subscriber Line (xDSL) technology.

17. The device according to claim 16, wherein the second network uses, is based on, or comprises, Asymmetric Digital Subscriber Line (ADSL) technology.

18. The device according to claim 17, wherein the second network uses, is based on, or comprises, ADSL2 or ADSL2+ technology.

19. The device according to claim 17, wherein the ADSL2 or ADSL2+ technology consists of, is based on, is compatible with, or comprises, ITU-T G.992.5 standard.

20. The device according to claim 16, further comprising a Digital Subscriber Line Access Multiplexer (DSLAM).

21. The device according to claim 1, wherein the first network further carrying a distinct third video stream in the data format having a lower bit rate and the data format translated using a multirater or a transrater from the first video stream, the device further operative for selecting one out of the first, the second, and the third video stream, and for transmitting the selected video stream over the second network.

22. The device according to claim 1, wherein the first network further carrying metadata associated with the second video stream, carried as an Out-of-Band (OOB) channel or with the second video stream.

23. The device according to claim 22, further operative for receiving the metadata from the first network and for handling the second video stream responsive to the metadata.

24. The device according to claim 22, wherein the metadata comprises a video quality level indicator, a consumed bandwidth, a visual noise, spurious edges, a localized motion distortion, Image Structural Similarities (SSIM), Peak-Signal-to-Noise-Ratio (PSNR), a Group of Pictures (GOP) parameter, statistics on moving vectors, macroblock types, or density, relating to the second video stream.

25. The device according to claim 22, further operative to receive the metadata via the first network, and wherein the selecting one of the first and the second video stream is responsive to the received metadata.

26. The device according to claim 22, wherein the metadata is indicated by a Packet Identifier (PID).

27. The device according to claim 22, wherein the metadata comprises the minimum required bandwidth for properly carrying each of the first and second video streams.

28. The device according to claim 1, further operative to measure or estimate the maximum bit rate.

29. The device according to claim 1, wherein the second network is operative to be in first and second distinct states, wherein the maximum bit rate is a first bit rate in the first state and a second bit rate in the second state, and wherein the selecting of the video stream comprises selecting the video stream associated with the highest bit rate that is lower from the first bit rate in the first state and the second bit rate in the second state.

* * * * *